March 13, 1956  H. J. HAMMERLY ET AL  2,738,445
PANELBOARD CONSTRUCTION
Filed Feb. 26, 1952
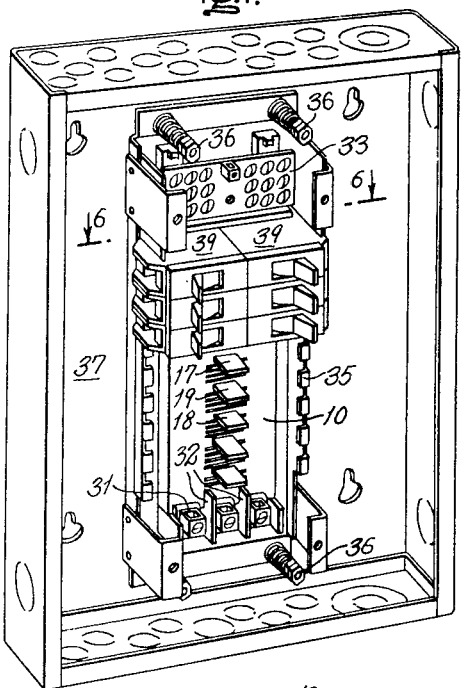
Inventors:
HERMAN J. HAMMERLY,
ROBERT T. CASEY,
WILFRED H. YEAMANS
by R. S. Allyn
Their Attorney.

United States Patent Office 2,738,445
Patented Mar. 13, 1956

2,738,445

PANELBOARD CONSTRUCTION

Herman J. Hammerly, Plainville, Robert T. Casey, Bristol, and Wilfred H. Yeamans, Plainville, Conn., assignors to General Electric Company, a corporation of New York Application February 26, 1952, Serial No. 273,473

15 Claims. (Cl. 317—119)

This invention relates to electrical panelboards, load centers and the like wherein provision is made for the assembly of a number of distribution control devices such as circuit breakers.

This application is a continuation in part of our copending application Serial Number 184,086, filed September 9, 1950, for Panelboard Construction, now abandoned.

Heretofore panelboards have taken the form of rigid bus bars which are separately mounted and supported in parallel relation in a panelboard enclosure, with line terminals on the ends of the respective bus bars, and branch electrical conductors for connecting a number of control units, such as circuit breakers, to each of the bus bars at spaced points along its length. Blocks of insulating material have been used to support the bus bars at their ends.

In a copending application, Serial Number 274,749, filed by William J. Fleming on March 4, 1952, and assigned to the same assignee as this application, is disclosed and claimed a compact assembly of bus bars and circuit breakers and quickly detachable mounting means for the circuit breakers including electric connectors of the plug-in type mounted on or carried by the bus bars on which the circuit breakers are plugged, together with hook supports for the opposite ends of the circuit breakers. The bus bars are supported separately in closely spaced relation by means of insulating supports or blocks at their ends, and to provide adequate electrical insulation between the bus bars each bus bar is provided with a thin layer or coating of electrical insulating material.

This arrangement of the aforesaid Fleming application has certain disadvantages in that the bus bars must be handled and assembled separately, the bus bars are supported at their ends only and are therefore subject to permanent distortion by the force applied in plugging the breakers on the bus bars or in removing them and by the electromagnetic repulsion forces set up by excessive or short circuit currents, and the thin layer of insulating material on each bus bar may be damaged by careless handling or by gouging with a screw driver. Moreover the thin layer of insulation is subject to faults because of deterioration from ageing. Also it is difficult to apply a thin layer of insulation of uniform thickness, the layer being somewhat thinner around the edges and corners of the bus bars.

Accordingly an object of the present invention is to provide a simple, compact, reliable and inexpensive bus bar assembly convenient for installation in a panel box or cabinet.

Another object of the invention is to provide a rugged unitary assembly of panelboard bus bars and terminals which can be handled, stored, or shipped as a separate item.

Another object of this invention is to provide insulating means for closely-spaced panelboard conductors which insulating means also serves as a support means for the conductors, thereby simplifying assembly procedure and costs.

Another object is to provide insulating means for panelboard conductors which cannot be easily damaged or scraped off the conductors even when jabbed by a screwdriver.

It is a further object of the invention to provide unitary insulating means for panelboard conductors which will resiliently support and enclose conductors in spaced relation throughout their lengths so as to minimize the possibility of distortion of the conductors whether due to magnetic forces such as created by currents of short circuit magnitude, or by pressure applied by an operator or installer.

In the preferred form of the invention, the bus bars are arranged in compact closely spaced relation and embedded in a resileint molded insulating body made of a vinyl resin composition with line terminals projecting from one end of the body and with contact blades projecting from spaced points along the length of the body and mechanically and electrically connected to intermediate points of the bus bars for the attachment of circuit breakers or other control devices. This molded unitary bus bar assembly is flat and rectangular in shape and is supported in a pan or tray by means of clamps engaging the molded body so that the molded body forms a support for the bus bars throughout their lengths while having sufficient resiliency to provide for expansion and contraction of the relatively rigid bus bars without damage to the molded body.

The invention is illustrated as adapted to a three-wire grounded neutral system of distribution but is equally adapted to a two-wire system.

In the accompanying drawings illustrating our embodiment of the invention:

Fig. 1 is a perspective view of a panelboard embodying the invention.

Fig. 2 is a front view and partly in section showing a bus-bar assembly unit on a somewhat larger scale.

Fig. 3 is a fragmentary partial vertical sectional view on the plane of the line 3—3 of Fig. 2 on a still larger scale.

Fig. 4 is a horizontal sectional view of the bus bar unit on the plane of the line 4—4 of Fig. 2 on a larger scale.

Fig. 5 is a perspective view showing the bus bars with the attached contact blades.

Fig. 6 is a plan view and partial section on the plane of the line 6—6 of Fig. 1 showing the mounting of two circuit breakers.

Fig. 7 is an end or edge view of a circuit breaker adapted for installation on a bus bar unit, parts being broken away.

In accordance with this invention, a resilient electrically insulating body or block 10 is provided in which the strap shaped bus bars 11, 12 and 13 are embedded to form a rugged unitary assembly. The body 10, preferably made of an electrically insulating vinyl resin plastisol composition, is cast or molded around the bus bars and has a flat rectangular shape. The three bus bars as embedded in the body 10 are arranged in parallel relation as shown in Fig. 5 and lying flatwise in a substantially common plane. Upwardly offset line terminal end portions 14, 15 and 16 are formed on the ends of the bus bars respectively and project from one end of the body 10 by means of which the bus bars can be connected to a suitable source of electric power supply. As shown in the drawing the lower plane surfaces of the terminals 14, 15 and 16 are substantially on the plane of the upper surface of the body 10, the laterally and upwardly extending connecting portions of the bus bars being embedded in the body 10, so that the terminals are substantially above the upper surface of the body 10. With three bus bars as disclosed, it is contemplated that the power supply circuit will be three-phase with a grounded or insulated neutral.

For the connection of the circuit breakers to the bus bars, each bus bar is provided with one or more connectors constituted by plug contact blades 17, 18 and 19 respectively which project from the upper surface of the body 10 in substantially edgewise transverse relation with said bus bars and said body and are arranged in flatwise alignment in a row or column extending centrally of the bus bar assembly. These blades are mechanically connected rigidly to the respective bus bars so as to be supported by the bus bars and are moreover electrically connected to their respective bus bars as by rivets as shown. As shown, the blade 17 has an integral extension or foot 20 which is secured to the bus bar 11 and which extends toward the righthand as seen in Fig. 5 and is offset upward to a point over the central bus bar 13 where it is joined with the lower end of the blade 17. A similar foot 21 is provided for supporting the blade 18 from the bus bar 12 while the blade 19 has a right angle portion at its lower end forming a foot 22 which is secured to the central bus bar 13. Each of the bus bars is provided with one or more holes 23 to provide for the passage therethrough of the liquid material of the body 10 when the bus bars are lowered into the material for the molding of the body 10 whereby air pockets are prevented. It will be observed from Figs. 3, 4 and 5 that the lower supporting portion or base for the blades 17 and 18 is closely spaced with respect to the central bus bar 13 as indicated by the reference numerals 24 and 25 (Fig. 5) but electrical insulation is provided by the material of the body 10 which fills the spaces 24 and 25. The bases of the blades 17 and 18 are also provided with holes 26 and 27 to allow the passage of liquid through the holes and prevent the formation of air pockets.

In the form shown in the drawing, particularly in Fig. 5, nine contact blades are provided, three contact blades being connected to each of the bus bars, the blades being connected in sequence to the bus bars for sequence phasing. In other words, the blade 18 is connected to the bus bar 12, the blade 19 to the bus bar 13, and the blade 17 to the bus bar 11, this sequence of connections being carried out for the remaining two groups of three blades each. The surface of the body 10 between adjacent contact blades and between the terminal 16 and the adjacent blade 18 is provided with projecting ribs 10' and with depressed grooves 10" between the ribs for the purpose of greatly increasing the surface distance between these parts, which are of opposite potential, whereby arcing over the surface is minimized.

This unitary assembly of the bus bars is secured in place in a supporting pan or tray 28 by means of clamps 29 as shown in Figs. 2 and 6. These clamps are secured to the pan 28 and extend over the upper surface of the body 10 so as to secure the assembly to the pan. Preferably at the bottom of the assembly is a supporting cross bar or block 30 made of electrically insulating material as shown particularly in Fig. 3. This block 30 extends beneath the terminals 14, 15 and 16 and forms a support for the connection lugs 31 (Fig. 1) which are in electrical engagement with the terminals, the lugs being secured by screws (not shown) to the block 30 with the terminals clamped between. Preferably the block 30 is secured to the terminals before the assembly is mounted in the pan, as indicated in Figs. 2 and 3. The block is separately secured to the pan by screws (not shown) at its ends and serves as a support for the lower ends of the bus bars. Insulating barrier plates 32 are provided between adjacent bus bar terminals, these plates extending into slots provided for them in the body 10 whereby they are supported.

In the top of the tray 28 immediately above the bus bar assembly is mounted an electrically conducting plate 33 which serves as a neutral terminal.

It will be observed that the mounting of the bus bars in the pan 28 is a very simple operation in view of the fact that the bus bars are secured by the body 10 in the desired predetermined positions with respect to each other and are handled as a unitary assembly.

Moreover this basic assembly can be economically produced at one central location, stocked, and shipped to remote manufacturing points throughout the country, where the only operations necessary are to fabricate the metal pan and enclosing box and to assemble the complete panelboard.

The supporting tray 28 has side walls 34 provided with hooks 35 on each side edge which serve as supports for the outer ends of the circuit breakers or control units 39, the inner ends of each pair of which are frictionally connected to one of the contact blades. The tray is supported in a box or cabinet 37 on posts 36 in the manner disclosed in the Rowe patent 2,138,408.

As shown in the drawing, the circuit breakers 39 are mounted on the tray 28 in pairs in end to end relation, the inner ends of each pair being electrically connected to and supported by one of the contact blades. For this purpose each blade is made wide enough to, in effect, constitute two contacts. Each circuit breaker or control unit is provided with suitable switching mechanism (not shown) operated by a lever or handle 40 for opening and closing the circuit and in addition is provided with current responsive means (not shown) for automatically opening the breaker in response to an excessive current. One such suitable circuit breaker mechanism per se is disclosed in the Getchell patent 2,455,753. Such mechanism will be provided with suitable circuit terminals.

The electric connection between each breaker and a contact blade is formed by spring knife blade contact jaws 41 mounted at the inner end of the breaker housing and forming one circuit terminal of the breaker, which jaws grasp a contact blade, the other circuit terminal 42 of the breaker being on the outer end of the breaker housing. On the end of the circuit breaker opposite the jaws 41 is a lug 43 which is adapted to fit into and interlock with one of the hooks 35 on the tray.

In the assembly of the circuit breakers, the lug 43 on each breaker is first engaged with a hook 35 opposite the contact blade to which the breaker is to be connected and then the breaker is swung about the hook 35 to force or plug the contact jaws 41 into frictional engagement with the contact blade which constitutes a support for the inner ends of the two breakers connected to it. Preferably the breakers are further secured in position by an outer trim plate (not shown) having a narrow strip extending over the inner abutting ends of the circuit breakers.

The insulating supporting body 10 must have excellent electrical insulating properties for the purpose of electrically insulating the closely spaced bus bars themselves as well as the blades connected to the outer bus bars which are closely spaced with respect to the central bus bar. The material must also have "non-tracking" properties, i. e. so that an arc along the surface of the material will not create a continuous carbonized path of low electrical resistance. It must furthermore be resilient and flexible to provide for expansion and contraction of the rigid bus bars in response to changes in temperature with resultant movement of the blades without damage to the insulating properties of the material. It must also be tough, non-absorbent of moisture, non-inflammable, must not deteriorate greatly with age even at elevated temperatures, either in sunlight or in humid atmospheres, and must be capable of resisting elevated temperatures, such as 85° C., for indefinite periods.

We have found that a satisfactory material for use in forming the body 10 and which gives the body 10 the foregoing properties is provided by a composition comprising a dispersion of a polyvinyl resin in a suitable plasticizer, in which composition the vinyl resin is initially in the form of powder or minute particles mixed with and suspended, i. e. dispersed, in a liquid plasticizer. This composition is fused or transformed into a solid coherent body by the action of heat which causes the resin particles and the liquid to fuse into a solid homogeneous mass by mutual solvation. Such plastic compositions are known to the trade as plastisols. More particularly the composition consists of the following materials in the percentage ranges by weight indicated:

| | Percent |
|---|---|
| Vinyl chloride resin (polyvinyl chloride) or a copolymer of vinylchloride such as vinyl chloride and vinyl acetate or vinylchloride and vinylidene chloride | 25 to 45 |
| Resinous plasticizer, such as (a) alkyd resin compositions, e. g. those derived from polybasic acids and polyhydric alcohols with or without modifying agents and (b) styrene polymers, e. g. the material known to the trade as Dow 276–V2 | 15 to 35 |
| Non-resinous plasticizer, such as di octyl phthalate, di butyl phthalate, di hexyl phthalate, tricresyl phosphate, or similar type materials | 10 to 25 |
| Stabilizer, such as lead stearate, lead silicate, antimony oxide, lead phosphate, blue lead or mixtures thereof | 5 to 12 |
| Non-inflammable filler, such as calcium carbonate | 0 to 20 |
| Carbon black coloring material | 0 to .75 |

Our preferred composition consists of vinyl chloride dispersion resin 36%, styrene polymer 27%, di octyl phthalate 18%, lead stearate 8%, calcium carbonate 10% and carbon black .5%.

It was found that an excessive proportion of the non-resinous plasticizer gives the material undesirable ageing characteristics, i. e. the material shrinks and hardens excessively when subjected to prolonged heating at high temperatures such as 100° C. To correct this, the non-resinous plasticizer is used in a relatively small amount with a greater amount of resinous plasticizer to reduce the ageing of the material to a desired minimum and give the material before it is solidified the desired liquid consistency. The preferred liquid composition described above has a consistency substantially that of S. A. E. No. 30 lubricating oil at normal atmospheric temperatures and consequently the liquid material can be poured freely into a mold. In the molding operation, the bus bars with the contact blades attached are secured to a support or fixture in the desired relative positions and slowly lowered into the liquid composition contained in a simple and inexpensive mold, and then the mold with the immersed bus bars is placed in an oven and heated to cause permanent solidification or fusing of the material. In a typical construction, the heating operation is carried out in an oven maintained at a temperature of approximately 150° C. and for a period of one hour. The method of and apparatus for forming the molded body 10 are described and claimed in our copending application Serial Number 184,087, filed September 9, 1950, now Patent No. 2,701,894.

Solidification of the material of the body 10 takes place with only slight shrinkage and no appreciable change in volume and as a result the material tightly encloses the bus bars and blades and the blades are maintained in precise alinement. Substantial shrinkage of the material would pull it away from the metal parts at some points and cause warping of the assembly.

The solidified body 10 made of our preferred composition has the appearance and general physical characteristics of resilient, flexible rubber, and has a Shore durometer hardness reading of 50 to 70. It is very tough and consequently not subject to damage during handling or by gouging with a screw driver. Another desirable quality is that the material does not adhere during the heating and fusing operation to metal surfaces and consequently the body 10 with the bus bars embedded in it can be removed easily from the mold after the heating operation. Since the molding operation is carried out without the application of pressure, the mold can be made at very low cost and a variety of molds provided for various types and sizes of assemblies.

The body 10 is sufficiently resilient to permit expansion and contraction of the bus bars without cracking or other impairment of its insulating properties. This resiliency characteristic is important because of the high cross sectional area ratio of the bus bars to the body 10 as shown in Fig. 4. The bus bars have substantial cross sections and are very rigid. In a typical panelboard construction such as shown in the drawing, the cross section of each bus bar is 3/32 in. x 1 in. It will be apparent that such a bus bar made of copper would have sufficient strength to break an insulating material which is brittle to any substantial extent. This possibility of damage to the body 10 by expansion and contraction of the bus bars is further increased by the fact that the bus bars are closely spaced together, about 3/8 in. apart in a typical assembly as shown in the drawing, and as a result the layer of insulating material between the bus bars is relatively thin. Moreover, the spacing between the central bus bar and the lower ends of the contact blades connected to the outside bus bars, i. e. at the points 24 and 25, is even much less, approximately 1/8 in. As indicated in Fig. 4, the blade 18 is separated from the bus bar 13 by a relatively thin layer of insulating material, approximately 1/8 in. thick, which is therefore quite fragile as compared with the bus bars and would be broken by the expansion and contraction force produced by the bus bars if a non-resilient or brittle material were used.

Moreover, the body 10 does not show objectionable decrease in its resiliency when subjected to extremely low temperatures and consequently the molded assembly can be handled freely and roughly at all usual temperatures during storage and shipment and during assembly in the pan 23 without danger of cracking or breaking the body.

While the body 10 is resilient, it at the same time has a rigidity effective to serve as a support for the bus bars when the assembly is secured in place by the clamps 29 engaging the body 10. Its rigidity is not substantially reduced when the assembly is subjected to high temperatures such as 85° C. The body 10 serves as a support for the bus bars throughout their lengths, except for the lower ends which are mounted on the block 30, so as to prevent distortion of the bus bars from electromagnetic repulsion forces set up by excessive or short circuit currents in the bus bars, and also prevent bending of the bus bars when the circuit breakers are plugged on or pulled off the contact blades.

Another advantage of this material when heated at the temperature indicated of approximately 150° C. is that it does not give off appreciable gases during the heating operation. This assures freedom from manufacturing hazards from combustible or explosive gases and moreover assures that the fused body 10 is free from voids or bubbles. The gas-free heating operation is assured by the relatively low heating temperature used of approximately 150° C. This freedom from voids or bubbles is of special importance in view of the relatively thin layers of the material between the bus bars and between certain of the blades and the central bus bar as previously noted. Bubbles or voids in these thin layers would of course seriously impair the insulation at these points. To prevent air bubbles all air is removed by evacuation from the liquid material before it is poured into the mold.

Another important characteristic of the material of the body 10 is that it is a somewhat better conductor of heat than air and as a result the bus bars and other conducting parts are actually maintained at a lower operating temperature, substantially 10% lower, than they would be maintained if the bus bars were supported in suitably spaced relation in accordance with conventional practice and insulated from each other by air alone. It will be observed that the surface of the body 10 which is exposed for the dissipation of heat by radiation and convection is somewhat greater than the surface area of the bus bars and other conducting parts themselves. For this reason and because of the better heat radiating characteristic of the material heat is dissipated from the body 10 to the air at a faster rate than it would be from the bare bus bars and other metal parts.

As previously noted, the material of the body 10 is non-tracking, i. e. an arc near its surface will not burn the material so as to produce a continuous path of carbonized material having relatively low electrical resistance. The material does not support combustion, i. e. is non-inflammable, as indicated by the fact that when a typical body 10 was exposed to the intense heat of a Bunsen burner for a 30 second period, combustion was supported to some extent but was limited to the area around the Bunsen burner flame. Upon removal of the flame the material extinguished itself within one or two seconds.

It will be understood that whereas we have disclosed a circuit breaker of the manually operated type provided with switch contacts which are separated to open the circuit in response to a pre-determined current, the term "circuit breaker" is defined to include other types of control units or circuit interrupters, such as switches, fuses and combinations of switches and fuses.

While we have described only certain preferred embodiments of the invention by way of illustration, many modifications will occur to those skilled in the art and we therefore wish to have it understood that we intend in the appended claims to cover all such modifications as fall within the true spirit and scope of the invention.

We claim:

1. A bus bar assembly for panelboards and the like comprising a body made of resilient, electrically insulating material, a plurality of rigid bus bars embedded in said body in substantially parallel spaced relation with each other, line terminals on said bus bars projecting from said body, and a plurality of connectors electrically connected and rigidly secured each to one of said bus bars intermediate its length so as to be supported by said bus bars and project from said body in spaced relation with each other, said insulating material being a homogeneous heat-solidified vinyl resin composition having combustion-inhibiting and arc-track-inhibiting properties, said body having a resiliency effective to provide for expansion and contraction of said bus bars in response to changes in temperature while having a rigidity effective to secure said bus bars together in a predetermined relation with each other and support said bus bars throughout their lengths.

2. A bus bar assembly for panelboards and the like comprising an elongated flat body made of resilient electrically insulating material, a plurality of rigid bus bars embedded in said body in closely spaced substantially parallel coplanar relation with each other and extending lengthwise of said body, line terminals on ends of said bus bars projecting from one end of said body, and a plurality of plug contacts electrically connected and rigidly secured each to one of said bus bars intermediate its length so as to be supported by said bus bars and project from an upper surface of said body in spaced relation with each other along the length of said body, said insulating material being a homogeneous heat-solidified vinyl resin composition having combustion-inhibiting and arc-track-inhibiting properties, said body having a resiliency effective to provide for expansion and contraction of said bus bars in response to changes in temperature while having a rigidity effective to secure said bus bars together in a predetermined relation with each other and support said bus bars throughout their lengths.

3. A bus bar assembly for panelboards and the like comprising a flat rectangular body made of resilient electrically insulating material, a plurality of rigid strap bus bars embedded in said body in closely spaced substantially parallel coplanar relation with each other, line terminal portions on ends of said bus bars projecting from one end of said body and having lower plane surfaces lying substantially in the plane of an upper surface of said body, and a plurality of plug contact blades electrically connected and rigidly secured each to one of said bus bars intermediate its length so as to be supported by said bus bars and project from said body in substantially edgewise transverse relation with said bus bars and in substantially flatwise alignment with each other centrally of said body, said insulating material being a homogeneous heat-solidified vinyl resin plastisol, said body having a resiliency effective to provide for expansion and contraction of said bus bars in response to changes in temperature while having a rigidity effective to secure said bus bars together in a predetermined relation with each other and support said bus bars throughout their lengths.

4. The combination in a panelboard or the like of a body made of resilient electrically insulating material, a plurality of rigid bus bars embedded in said body in substantially parallel spaced relation with each other, line terminals on said bus bars projecting from one end of said body, a plurality of plug contacts electrically connected and rigidly secured each to one of said bus bars intermediate its length so as to be supported by said bus bars and project from an upper surface of said body in spaced relation with each other along the length of said body, said insulating material being a homogeneous heat-solidified vinyl resin plastisol, said body having a resiliency effective to provide for expansion and contraction of said bus bars in response to changes in temperature while having a rigidity effective to secure and support said bus bars in a predetermined electrically insulated relation with each other in a unitary molded assembly, a support for said assembly, and clamping members secured to said support and engaging said body to secure said molded assembly on said support.

5. The combination in a panelboard or the like of a flat rectangular body made of resilient electrically insulating material, a plurality of rigid strap bus bars embedded in said body in closely spaced substantially parallel coplanar relation with each other, line terminals on the ends of said bus bars projecting from one end of said body substantially above the plane of an upper surface of said body, a plurality of plug contact blades electrically connected and rigidly secured each to one of said bus bars intermediate its length so as to be supported by said bus bars and project from an upper surface of said body in substantially edgewise transverse relation with said bus bars and in substantially flatwise alignment with each other centrally of said body, a plurality of ribs on the upper surface of said body between adjacent said contact blades for increasing the surface distance between said blades, said insulating material being a homogeneous heat-solidified vinyl resin plastisol, said body having a resiliency effective to provide for expansion and contraction of said bus bars in response to changes in temperature while having a rigidity effective to secure and support said bus bars in a predetermined electrically insulated relation with each other in a unitary assembly, a support for said assembly provided with a flat surface, and clamping members secured to said support and engaging said body to secure said assembly on said flat surface.

6. The combination in a panelboard or the like, of a body made of resilient electrically insulating material formed of a homogeneous heat-solidified mass of vinyl resin plastisol, a plurality of bus bars embedded in said body in substantially parallel relation with each other, a plurality of plug contact blades, electrically conducting members embedded in said body electrically and rigidly connecting said blades each to one of said bus bars and supporting said blades to project outwardly from said body in substantially edgewise transverse relation with said bus bars and in substantially flatwise alignment with each other centrally of said body, a support, clamping members secured to said support and engaging said body to secure said body and said bus bars on said support, pairs of circuit breakers having the circuit breakers of each pair extending in end to end abutting relation crosswise of said body, and a pair of contact terminals mounted respectively on the abutting ends of the circuit breakers of each pair frictionally engaging opposite portions of one of said contact blades thereby to connect electrically and detachably secure each said pair of circuit breakers to one of said contact blades in endwise abutting relation.

7. The combination in a panelboard or the like, of a body made of resilient electrically insulating material formed of a homogeneous heat-solidified mass of vinyl resin plastisol, a plurality of bus bars embedded in said body in substantially parallel coplanar electrically insulated relation with each other, a plurality of plug contact blades electrically connected each to one of said bus bars so as to project outward from said body in substantially edgewise transverse relation with said body and said bus bars and in alignment with each other, a support, clamping members secured to said support and engaging said body to secure said body and said bus bars on said support, a plurality of circuit breakers extending each transversely of said body, a contact terminal on a first end of each of said circuit breakers frictionally engaging one of said contact blades thereby to connect electrically said circuit breakers each to one of said contact blades and detachably secure said first ends to said support, and detachable connections between the opposite ends of said circuit breakers respectively and said support, said detachable connections between each circuit breaker and said support being arranged to be engaged when the first end of the circuit breaker is tilted away from said support after which said first end is moved toward said support to bring its contact terminal into engagement with said blade.

8. A bus bar and circuit breaker assembly for panelboards and the like, comprising a tray provided with side walls, a body of resilient electrically insulating material mounted in said tray, said insulating material being a homogeneous heat-solidified vinyl resin plastisol, a plurality of bus bars embedded in said body in substantially parallel coplanar electrically insulated relation with each other, a plurality of plug contact blades, electrically conducting members embedded in said body electrically connecting said blades each to one only of said bus bars and supporting said blades to project outward from said body in substantially edgewise transverse relation with said body and said bus bars and in substantially flatwise alignment with each other centrally of said tray, pairs of circuit breakers having the circuit breakers of each pair extending in end to end relation crosswise of said body, contact terminals on the adjacent ends of each of said circuit breakers of each pair frictionally engaging opposite portions of a single one of said contact blades thereby to connect electrically said circuit breakers to said contact blade and detachably secure said adjacent ends to said blade, and detachable connections between the opposite ends of said circuit breakers of each pair respectively and opposite side walls of said tray, said detachable connection between each circuit breaker and said tray being arranged to be engaged when the adjacent end of the circuit breaker is tilted away from said tray after which said adjacent end is moved toward said tray to bring its contact terminal into engagement with said blade.

9. A bus bar assembly for panelboards and the like comprising a plurality of substantially rigid bus bars, and a solid body of electrically insulating material embedding and supporting said bus bars and having a resiliency effective to provide for expansion and contraction of the bus bars in response to changes in temperature, said insulating material being a heat-solidified vinyl resin plastisol.

10. A bus bar assembly for panelboards and the like comprising a plurality of substantially rigid bus bars, and a solid body of electrically insulating material embedding and supporting said bus bars and having a resiliency effective to provide for expansion and contraction of the bus bars in response to changes in temperature, said insulating material comprising a heat solidified vinyl resin plastisol composition comprising 25 to 45% of vinyl chloride resin, 15 to 35% of resinous plasticizer, 10 to 25% of non-resinous plasticizer, 5 to 12% of stabilizer, and up to 20% of non-inflammable filler.

11. A bus bar assembly for panelboards and the like comprising a plurality of substantially rigid bus bars, and a solid body of electrically insulating material embedding and supporting said bus bars and having a resiliency effective to provide for expansion and contraction of the bus bars in response to changes in temperature, said insulating material being a homogeneous, resilient, heat-solidified vinyl resin plastisol composition including both resinous and non-resinous plasticizers and at least 25% by weight vinyl chloride resin.

12. A separate bus bar unit for panelboards comprising a plurality of substantially straight, rigid bus bars, and a flat rectangular body of flexible electrically insulating material in which said bus bars are completely embedded except for a line terminal end of each bus bar projecting from a common end of said body, a plurality of circuit breaker plug contact blades projecting from one side of said body in crosswise relation with said bus bars and arranged in flatwise alignment with each other in a row centrally of said body, rigid electrically conducting members securing said blades each to one of said bus bars thereby to support said blade on said bus bar and electrically connect said blade to said bus bar, said rigid members and the lower ends of said blades being embedded in said body, said body having a rigidity effective to support said bus bars throughout their lengths to provide for forcing on said blades cooperating contact jaws carried on the ends of circuit breakers without deforming said bus bars, said insulating body being formed of a heat-solidified material which is non-inflammable, non-tracking, non-aging and sufficiently flexible to permit thermal expansion and contraction of said rigid bus bars without damaging the electrically insulating properties of said material while at the same time securing said bus bars in a predetermined parallel closely spaced relation with said blades in a row ready for installation in a panelboard box, said insulating body having a flat side opposite said blades adapted to be clamped in a predetermined position against the wall of a panelboard box with said blades in alignment.

13. A panelboard comprising the combination of a plurality of metal bus bars spaced in closely adjacent relation to one another, said bars including line terminals, an insulating self-supporting body enveloping and embedding said bus bars except for said line terminals, and constituting the main support for said bars, a plurality of sets of electrical contact blades projecting beyond said insulating body in spaced relation to one another, each set being electrically connected with and rigidly secured to one of said bus bars, said insulating body being a heat-solidified plastisol containing as essential and substantial components vinyl chloride resin, resinous material and liquid non-resinous material, said enveloping body having a resiliency effective to withstand without cracking thermal expansion and contraction of said embedded members and also having sufficient rigidity to maintain said members in desired spatial relation as a unitary structure.

14. An integral bus bar unit for electric panelboards comprising a homogeneous cast body of heat-solidified vinyl resin plastisol, a plurality of rigid bus bars embedded in said body in substantially coplanar parallel spaced relation and having line terminals at one end thereof protruding from said body, a plurality of plug contact members fixed to said bars and projecting from said body in spaced apart relation, a support, and means engaging said body to mount said body on said support.

15. An integral bus bar unit for electric panelboards comprising a homogenous cast body of heat-solidified vinyl resin plastisol containing resinous and non-resinous plasticizers, a plurality of rigid bus bars embedded in said body in parallel spaced relation and having line terminals at one end thereof protruding from said body, a plurality of plug contact members fixed to said bars and projecting from said body in spaced apart relation, said cast body being sufficiently resilient to provide for expansion and contraction of said bars and sufficiently rigid to support said bars throughout their lengths and being substantially non-inflammable, non-aging and non-tracking, a supporting member having a flat surface, and means engaging said body to hold said body in flatwise engaging relation on said flat surface.

References Cited in the file of this patent

UNITED STATES PATENTS

| Number | Name | Date |
|---|---|---|
| 948,835 | Schmidt | May 24, 1910 |
| 1,203,582 | Chase | Nov. 7, 1916 |
| 1,691,422 | Aalborg | Nov. 13, 1928 |
| 1,902,790 | Starrett | Mar. 21, 1933 |
| 1,913,552 | Jackson | June 13, 1933 |
| 2,007,174 | Benjamin | July 9, 1935 |
| 2,206,325 | Lomax | July 2, 1940 |
| 2,331,654 | Butler | Oct. 12, 1943 |
| 2,439,326 | Wilson | Apr. 6, 1948 |
| 2,530,548 | Stanley | Nov. 21, 1950 |
| 2,595,658 | Hasselhorn | May 6, 1952 |
| 2,606,957 | Rypinski | Aug. 12, 1952 |